(12) United States Patent
Nagura

(10) Patent No.: US 11,353,729 B2
(45) Date of Patent: Jun. 7, 2022

(54) LIQUID CRYSTAL DISPLAY DEVICE AND PROJECTION TYPE DISPLAY DEVICE

(71) Applicant: SONY SEMICONDUCTOR SOLUTIONS CORPORATION, Kanagawa (JP)

(72) Inventor: Moriyasu Nagura, Kumamoto (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/059,096

(22) PCT Filed: Apr. 1, 2019

(86) PCT No.: PCT/JP2019/014551
§ 371 (c)(1),
(2) Date: Nov. 25, 2020

(87) PCT Pub. No.: WO2019/235046
PCT Pub. Date: Dec. 12, 2019

(65) Prior Publication Data
US 2021/0223590 A1    Jul. 22, 2021

(30) Foreign Application Priority Data
Jun. 5, 2018    (JP) .............................. JP2018-107549

(51) Int. Cl.
*G02F 1/133* (2006.01)
*G02F 1/1335* (2006.01)
(Continued)

(52) U.S. Cl.
CPC ........ *G02F 1/13306* (2013.01); *G02F 1/1368* (2013.01); *G02F 1/133345* (2013.01);
(Continued)

(58) Field of Classification Search
CPC .................................................. G02F 1/13306
See application file for complete search history.

(56) References Cited

U.S. PATENT DOCUMENTS

2008/0094547 A1*  4/2008  Sugita ............... G02F 1/133536
                                                  349/96
2010/0165220 A1*  7/2010  Endo .................... H04N 9/3105
                                                  349/8

(Continued)

FOREIGN PATENT DOCUMENTS

CN    102124399 A    7/2011
CN    104330915 A    2/2015
(Continued)

OTHER PUBLICATIONS

International Search Report and Written Opinion of PCT Application No. PCT/JP2019/014551, dated Jun. 18, 2019, 11 pages of ISRWO.

*Primary Examiner* — Sang V Nguyen
(74) *Attorney, Agent, or Firm* — Chip Law Group

(57) ABSTRACT

A liquid crystal display device includes a plurality of pixels each including a pixel electrode and a counter electrode provided with a liquid crystal layer interposed therebetween, a drive circuit layer on a surface side of the pixel electrode opposite to a surface side on which the liquid crystal layer is provided, in which a drive circuit is formed including a drive transistor that controls application of a potential to the pixel electrode, a drive-side substrate on a surface of the drive circuit layer opposite to a surface on which the pixel electrode is provided and a counter-side substrate on a surface of the counter electrode opposite to a surface on which the liquid crystal layer is provided, in which the drive circuit layer includes a wire grid polarizer facing the pixel electrode, the wire grid polarizer includes metal wires extending in one direction, and given a predetermined potential.

12 Claims, 7 Drawing Sheets

(51) Int. Cl.
  *G02F 1/1333* (2006.01)
  *G02F 1/1362* (2006.01)
  *G02F 1/1368* (2006.01)

(52) U.S. Cl.
  CPC .. *G02F 1/133548* (2021.01); *G02F 1/136209* (2013.01); *G02F 1/136213* (2013.01)

(56) References Cited

U.S. PATENT DOCUMENTS

| | | | |
|---|---|---|---|
| 2011/0141422 A1 | 6/2011 | Yanagawa | |
| 2016/0363812 A1* | 12/2016 | Li | G02F 1/1341 |
| 2017/0294565 A1* | 10/2017 | Kim | H01L 25/167 |
| 2020/0335531 A1* | 10/2020 | Yoshida | G02F 1/136209 |

FOREIGN PATENT DOCUMENTS

| | | | | |
|---|---|---|---|---|
| EP | 2322979 A1 | | 5/2011 | |
| EP | 3217213 A1 | | 9/2017 | |
| JP | 2007-017762 A | | 1/2007 | |
| JP | 2007-199241 A | | 8/2007 | |
| JP | 2007199241 | * | 8/2007 | ........... G02F 1/1335 |
| JP | 2008-145649 A | | 6/2008 | |
| JP | 2010-117474 A | | 5/2010 | |
| JP | 2010117474 | * | 5/2010 | ........... G02F 1/1335 |
| KR | 10-2011-0025880 A | | 3/2011 | |
| WO | 2010/021104 A1 | | 2/2010 | |
| WO | 2016/070542 A | | 5/2016 | |

\* cited by examiner

LIQUID CRYSTAL DISPLAY DEVICE AND PROJECTION TYPE DISPLAY DEVICE

CROSS REFERENCE TO RELATED APPLICATIONS

This application is a U.S. National Phase of International Patent Application No. PCT/JP2019/014551 filed on Apr. 1, 2019, which claims priority benefit of Japanese Patent Application No. JP 2018-107549 filed in the Japan Patent Office on Jun. 5, 2018. Each of the above-referenced applications is hereby incorporated herein by reference in its entirety.

FIELD

The present disclosure relates to a liquid crystal display device and a projection type display device.

BACKGROUND

In recent years, a technique of a projection type display device (projector) using a liquid crystal display device has been developed. A plurality of pixels is arranged in the liquid crystal display device, and a polarizer is provided in each pixel. In the liquid crystal display device, by controlling of polarization of incident light in each pixel, it is controlled whether or not the incident light can pass through the polarizer provided on an emission side. Accordingly, the liquid crystal display device can reflect image information including pixel information of each pixel in emitted light, and thus a desired image or the like can be displayed on the projection type display device.

In the projection type display device, the image information is read out by controlling of polarization in the liquid crystal display device and an image is displayed. Therefore, when light leakage occurs in the liquid crystal display device, defective image quality or the like is caused. As a method for suppressing such defective image quality, there is a method for suppressing light leakage. For example, the technique described in Patent Literature 1 is disclosed as a technique for suppressing light leakage.

Patent Literature 1 discloses a technique of suppressing a phenomenon in which incident light is reflected by a polarizer and irradiated to a drive transistor or the like (so-called return light) in order to suppress image defects (flicker or the like) due to light leakage. Specifically, in the liquid crystal display device, a pixel electrode, an inorganic polarizer, and a drive transistor are arranged in this order from an incident surface side of the incident light so that the return light from the polarizer does not strikes the drive transistor.

CITATION LIST

Patent Literature

Patent Literature 1: JP 2008-145649 A

SUMMARY

Technical Problem

However, in the technique disclosed in Patent Literature 1, countermeasures against image quality defects due to return light are mainly taken, and further countermeasures against incident light, which is one of factors of image quality defects, have been required. In the projection type display device as described in Patent Literature 1, in order to improve the image quality, for example, it is necessary to increase brightness of a display image, that is, to improve an aperture ratio of each pixel of the liquid crystal display device. In view of the above circumstances, it is desirable to further improve the aperture ratio in the liquid crystal display device.

Solution to Problem

According to the present disclosure, a liquid crystal display device is provided that includes: a plurality of pixels each including: a pixel electrode and a counter electrode provided with a liquid crystal layer interposed between the pixel electrode and the counter electrode; a drive circuit layer provided on a surface side of the pixel electrode opposite to a surface side on which the liquid crystal layer is provided, in which a drive circuit is formed including a drive transistor that controls application of a potential to the pixel electrode; a drive-side substrate provided on a surface of the drive circuit layer opposite to a surface on which the pixel electrode is provided; and a counter-side substrate provided on a surface of the counter electrode opposite to a surface on which the liquid crystal layer is provided, wherein the drive circuit layer is provided with a wire grid polarizer facing the pixel electrode, the wire grid polarizer being formed through arranging of metal wires extending in one direction at equal intervals, and given a predetermined potential.

Moreover, according to the present disclosure, a projection type display device is provided that includes: a light source, a condensing optical system that guides light emitted from the light source to a liquid crystal display device, and a projection optical system that enlarges and projects light optically modulated by the liquid crystal display device, wherein the liquid crystal display device includes a plurality of pixels each including: a pixel electrode and a counter electrode provided with a liquid crystal layer interposed between the pixel electrode and the counter electrode; a drive circuit layer provided on a surface side of the pixel electrode opposite to a surface side on which the liquid crystal layer is provided, in which a drive circuit is formed including a drive transistor that controls application of a potential to the pixel electrode; a drive-side substrate provided on a surface of the drive circuit layer opposite to a surface on which the pixel electrode is provided; and a counter-side substrate provided on a surface of the counter electrode opposite to a surface on which the liquid crystal layer is provided, and the drive circuit layer is provided with a wire grid polarizer facing the pixel electrode, the wire grid polarizer being formed through arranging of metal wires extending in one direction at equal intervals, and given a predetermined potential.

According to the present disclosure, a structure for forming storage capacitance of each pixel in a liquid crystal display device is provided in an aperture region, whereby a structure for forming existing storage capacitance provided in a light-shielding region can be reduced in size.

Advantageous Effects of Invention

According to the present disclosure as described above, an aperture ratio can be improved.

Note that the above-described effect is not necessarily restrictive, and any one of effects described in the present specification or any another effect obtainable from the present specification may be exhibited in addition to or in place of the above-described effect.

DESCRIPTION OF EMBODIMENT

Figure 1:
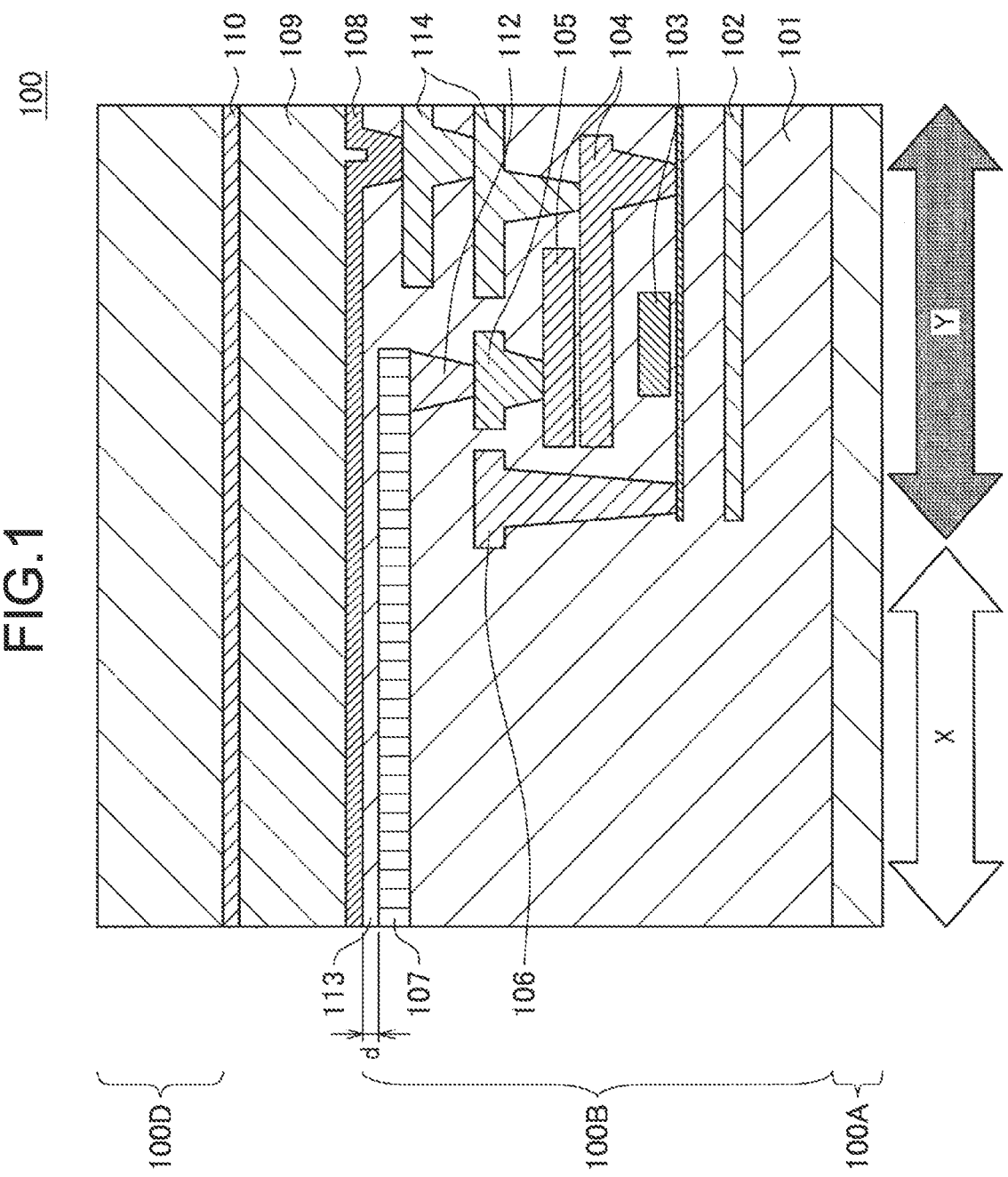
FIG. 1 is a sectional view illustrating a liquid crystal display device according to an embodiment of the present disclosure.

Hereinafter, a preferred embodiment of the present disclosure will be described in detail with reference to the accompanying drawings. In the present specification and the drawings, components having substantially the same functional configuration will be denoted with the same reference numerals and redundant description will be omitted.

Note that the description will be given in the following order.
1. Configuration of liquid crystal display device
2. Modification of the present disclosure
3. Application example
4. Example

1. Configuration of Liquid Crystal Display Device

First, a configuration of a liquid crystal display device according to an embodiment of the present disclosure will be described with reference to FIG. 1. FIG. 1 is a sectional view schematically illustrating a section of the liquid crystal display device according to the embodiment of the present disclosure, which is cut in a laminating direction.

In the following description, the laminating direction of each layer in a liquid crystal display device 100 will be referred to as a vertical direction. Further, a direction in which a drive-side substrate 100A is arranged is expressed as a downward direction, and a direction in which a counter-side substrate 100D is arranged is expressed as an upward direction. Further, in the following description, "capable of transmitting visible light" means, for example, that a transmittance of light having a wavelength belonging to a visible light band is 80% or more on average.

As illustrated in FIG. 1, the liquid crystal display device 100 is provided with a pixel electrode 108 and a counter electrode 110 with a liquid crystal layer 109 interposed therebetween. A drive circuit layer 100B is provided on a surface side of the pixel electrode opposite to a surface side on which the liquid crystal layer is provided, and the drive-side substrate 100A is provided on a surface of the drive circuit layer 100B opposite to a surface on which the pixel electrode 108 is provided. Further, the counter-side substrate 100D is provided on a surface of the counter electrode 110 opposite to a surface on which the liquid crystal layer 109 is provided. In the drive circuit layer 100B, a wire grid polarizer 107 formed by arranging of metal wires extending in one direction at equal intervals and given a predetermined potential is provided to face the pixel electrode 108.

The drive-side substrate 100A functions as a base on which the drive circuit layer 100B is laminated. The drive-side substrate 100A is a substrate formed of a transparent material capable of transmitting visible light, and may be, for example, a glass substrate. On the other hand, the counter-side substrate 100D has a function of protecting the liquid crystal layer 109 and the counter electrode 110. The counter-side substrate 100D is a substrate formed of a transparent material capable of transmitting visible light, like the drive-side substrate 100A, and may be a glass substrate or the like.

The pixel electrode 108 and the counter electrode 110 control an alignment of the liquid crystal contained in the liquid crystal layer 109 in each pixel. Specifically, the pixel electrode 108 and the counter electrode 110 control the alignment of the liquid crystal contained in the liquid crystal layer 109 by an electric field generated between the pixel electrode 108 and the counter electrode 110. For example, a uniform potential is applied to the counter electrode 110, and a potential controlled by a drive transistor 103 described later is applied to the pixel electrode 108 to control the alignment of the liquid crystal contained in the liquid crystal layer 109. The pixel electrode 108 and the counter electrode 110 may be formed of a transparent conductive material capable of transmitting visible light. In particular, the pixel electrode 108 may be specifically formed of indium tin oxide (ITO), graphene, or the like. The higher the visible light transmittance of the pixel electrode 108 and the counter electrode 110, the stronger light emitted from the liquid crystal display device 100, and therefore improvement in image quality and the like can be expected.

The drive circuit layer 100B controls driving of each pixel of the liquid crystal display device 100. A structure of the drive circuit layer 100B illustrated in FIG. 1 will be described below. First, in the drive circuit layer 100B, a scanning line 102, the drive transistor 103, a common potential connection contact plug 112, the wire grid polarizer 107, common potential wiring 105, circuit wiring 114 for bringing the drive transistor 103 and the pixel electrode 108 into conduction with each other, and a signal line electrode 106 are formed.

The scanning line 102, the drive transistor 103, the common potential connection contact plug 112, the wire grid polarizer 107, the common potential wiring 105, the circuit wiring 114, the signal line electrode 106, and the like may be formed of metal materials known as forming materials for these elements. For example, a metal or an alloy such as copper (Cu), aluminum (Al), gold (Au), platinum (Pt), titanium (Ti), chromium (Cr), or tungsten (W) can be used.

As a positional relationship among these elements, the scanning line 102 is provided closest to a side of the drive-side substrate 100A in the drive circuit layer 100B. The drive transistor 103 is provided above the scanning line 102 via an interlayer insulating film. The signal line electrode 106 for supplying electric power from a power source is connected to a source of the drive transistor 103, and a pair of conductive materials 104 is arranged in the vertical direction above the drive transistor 103 via the interlayer insulating film. The pair of conductive materials 104 is provided by sandwiching the interlayer insulating film to form a capacitor and storage capacitance of a pixel. The lower conductive material is brought into conduction with a drain of the drive transistor 103, and the upper conductive material 104 is electrically connected to the common potential wiring 105 provided above the pair of conductive materials 104. The drain of the drive transistor 103 is connected to the lower conductive material of the pair of conductive materials 104 and the lower conductive material, and is electrically connected to the pixel electrode 108 above by the circuit wiring 114 connecting to the pixel electrode 108. The common potential wiring 105 is electrically connected to the wire grid polarizer 107 provided above the common potential wiring 105 via the common potential connection contact plug 112.

Here, a plane region of a plurality of pixels including the drive circuit layer 100B is divided into an aperture region X in which incident light can pass through the drive circuit layer 100B, and a light-shielding region Y in which the incident light is shielded by wiring or the like in the drive circuit layer 100B. In the structure illustrated in FIG. 1, the plane region where the scanning line 102, the drive transistor 103, the common potential connection contact plug 112, the common potential wiring 105, the signal line electrode 106, and the circuit wiring 114 are provided is the light-shielding region Y, and the region other than that is the aperture region X. Note that, for example, a light-shielding film may be formed on an upper side of the drive circuit layer 100B in light-shielding region Y in order to enhance a light-shielding property. The light-shielding film may be made of a light-shielding member such as chrome or carbon, for example. The light-shielding region Y may be shielded by the light-shielding film, but is not limited to such an example, and may be shielded by forming of a light-shielding structure. For example, any one layer of the drive circuit layer 100B may be provided with a light-shielding structure extending in a plane orthogonal to the laminating direction.

The wire grid polarizer 107 is provided at least in the aperture region X so as to face the pixel electrode 108. A part of the wire grid polarizer 107 extends to the light-shielding region Y, and the light-shielding region Y is provided with the common potential connection contact plug 112 that connects the wire grid polarizer 107 to the common potential wiring 105. A connection position between the wire grid polarizer 107 and the common potential connection contact plug 112 is not particularly limited as long as the position is provided in the light-shielding region Y.

The positional relationship of various structures provided in the drive circuit layer 100B has been described above. Next, functions and configurations of various structures provided in the drive circuit layer 100B will be described.

(Drive Transistor)

The drive transistor 103 is provided corresponding to each pixel of the liquid crystal display device 100, and controls application of a potential to the pixel electrode 108 of each pixel. Specifically, the drive transistor 103 provided in each pixel selectively drives an arbitrary pixel to display a desired image, characters, or the like on the liquid crystal display device 100.

For example, the drive transistor 103 may be a thin film transistor (TFT). In such a case, the drive transistor 103 may include a semiconductor layer provided in the drive circuit layer 100B, a gate insulating film provided on the semiconductor layer, and a gate electrode provided on the gate insulating film.

(Wire Grid Polarizer)

The wire grid polarizer 107 is configured by arranging of metal wires extending in one direction at equal intervals. The wire grid polarizer 107 transmits, of the light transmitted through slits between the metal wires arranged in parallel, a polarized component in a direction orthogonal to a direction in which a conductive material extends, and reflects a polarized component that is parallel to a direction in which the conductive material extends. The metal wires of the wire grid polarizer 107 can be formed of, for example, a metal material that can be processed in a narrow pitch of 100 nm to 500 nm that can cover a visible light region. Specifically, the metal wires of the wire grid polarizer 107 can be formed of aluminum.

Since characteristics as a polarizer improves as a refractive index decreases, the wire grid polarizer 107 most desirably has a space around each metal wire. Alternatively, a periphery of the metal wire of the wire grid polarizer 107 may be filled with a material having a low refractive index. As the low refractive index material filling the periphery of the metal wire, a material may be used whose refractive index is as low as possible in consideration of manufacturability and feasibility. The periphery of the metal wire of the wire grid polarizer 107 may be filled with a general optical thin film material such as magnesium fluoride (refractive index n=1.38).

Since the wire grid polarizer 107 is provided on a surface side of the uniformly formed drive circuit layer 100B, the wire grid polarizer 107 can be formed by vapor deposition and photolithography. Alternatively, the wire grid polarizer 107 may be formed by vapor deposition and nanoimprint technology.

Figure 2:
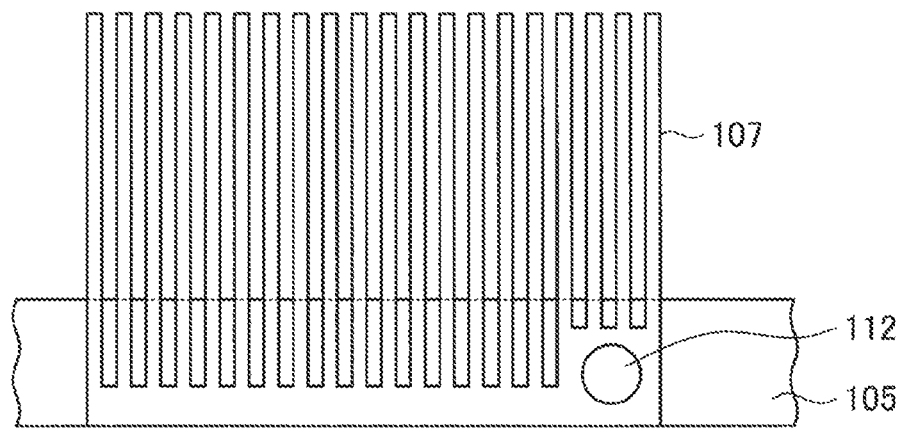
FIG. 2 is a plan view of a polarizer of the liquid crystal display device according to the same embodiment as seen from directly above.

A planar shape of the wire grid polarizer 107 will be further described with reference to FIG. 2. FIG. 2 is a plan view of the wire grid polarizer 107 illustrated in FIG. 1 viewed from the laminating direction. As illustrated in FIG. 2, the wire grid polarizer 107 is formed by arranging of metal wires extending in one direction at equal intervals, and ends of the metal wires are connected to each other. The metal wires of the wire grid polarizer 107 are electrically connected to each other, and thus the entire wire grid polarizer 107 can serve as a common potential. The common potential connection contact plug 112 to be connected to the common potential wiring 105 is formed at an end of a region where the ends of the metal wires are connected to each other in a direction orthogonal to an extending direction of the metal wires. That is, the common potential connection contact plug 112 is formed at a corner of the planar shape of the wire grid polarizer 107. In this example, the metal wires of the wire grid polarizer 107 are all made of the same material. However, the metal wires of the wire grid polarizer 107 are not limited to this example, and may be formed of any material as long as the material is conductive.

Further, in FIG. 2, the common potential connection contact plug 112 is formed at the corner of the planar shape of the wire grid polarizer 107, but a position in which the common potential connection contact plug 112 is formed is not limited to this example. The common potential connection contact plug 112 may be formed in the light-shielding region Y. Further, the metal wires of the wire grid polarizer 107 may not be electrically connected at their ends as long as the metal wires are electrically connected to each other.

Returning to FIG. 1 and continuing the description, the wire grid polarizer 107 is provided so as to face the pixel electrode 108 via a first insulating layer 113 while keeping a distance d in the laminating direction. The pixel electrode 108 and the wire grid polarizer 107 are provided so as to sandwich the first insulating layer 113 to form a first capacitor. The distance d between the wire grid polarizer 107 and the pixel electrode 108 may be appropriately determined according to the storage capacitance of each pixel of the liquid crystal display device. Specifically, since the first capacitor forms a part of the storage capacitance of each pixel of the liquid crystal display device, the distance d is appropriately determined according to the storage capacitance of each pixel of the liquid crystal display device.

(First Insulating Layer)

The first insulating layer 113 is formed of a transparent insulating material having visible light transmissivity so as not to block light incident on the wire grid polarizer 107. The higher the visible light transmissivity of the first insulating layer 113, the less a loss amount of the light incident on the wire grid polarizer 107. The first insulating layer 113 may be formed of, for example, the same material as the interlayer insulating film of the drive circuit layer 100B, or may be formed of a material different from the material of the interlayer insulating film of the drive circuit layer 100B. The first insulating layer 113 may be formed of a transparent insulating material including silicon oxide, silicon nitride, silicon oxynitride, hafnium oxide, or aluminum oxide. Further, the first insulating layer 113 may be formed of a high dielectric constant material, so called a High-K material, such as hafnium oxide or aluminum oxide. By forming the first insulating layer 113 with such a High-K material, the first capacitor can increase the capacitance.

(A Pair of Conductive Materials (Second Capacitor))

The pair of conductive materials 104 is configured such that the upper conductive material 104 is connected to the common potential wiring 105 arranged above the pair of conductive materials 104 and the lower conductive material is connected to the drive transistor 103. Since the pair of conductive materials 104 is provided so as to face each other with the interlayer insulating film of the drive circuit layer 100B interposed therebetween, the pair of conductive materials 104 can function as a second capacitor. The second capacitor constitutes a part of the storage capacitance of each pixel of the liquid crystal display device. The pair of conductive materials 104 may be formed of, for example, a metal material or polysilicon. Note that the pair of conductive materials 104 may face each other with an insulating layer formed of a material different from that of the interlayer insulating film of the drive circuit layer 100B, instead of the interlayer insulating film of the drive circuit layer 100B.

(Common Potential Wiring)

The common potential wiring 105 is a wiring that supplies a common potential (also referred to as a common potential) to each pixel of the liquid crystal display device 100. The common potential wiring 105 is electrically connected to the wire grid polarizer 107 of the first capacitor formed by the pixel electrode 108 and the wire grid polarizer 107, and one of the pair of conductive materials 104 of the second capacitor formed by the pair of conductive materials 104. Accordingly, the first capacitor and the second capacitor can accumulate electric charges based on a potential difference between a drive potential and the common potential when the drive potential is supplied to the pixel electrode 108 by the drive transistor 103.

A cross-sectional structure of the liquid crystal display device 100 and a plane structure of the wire grid polarizer 107 have been described above with reference to FIGS. 1 and 2. Subsequently, a three-dimensional structure of the first capacitor will be described with reference to FIG. 3.

Figure 3:
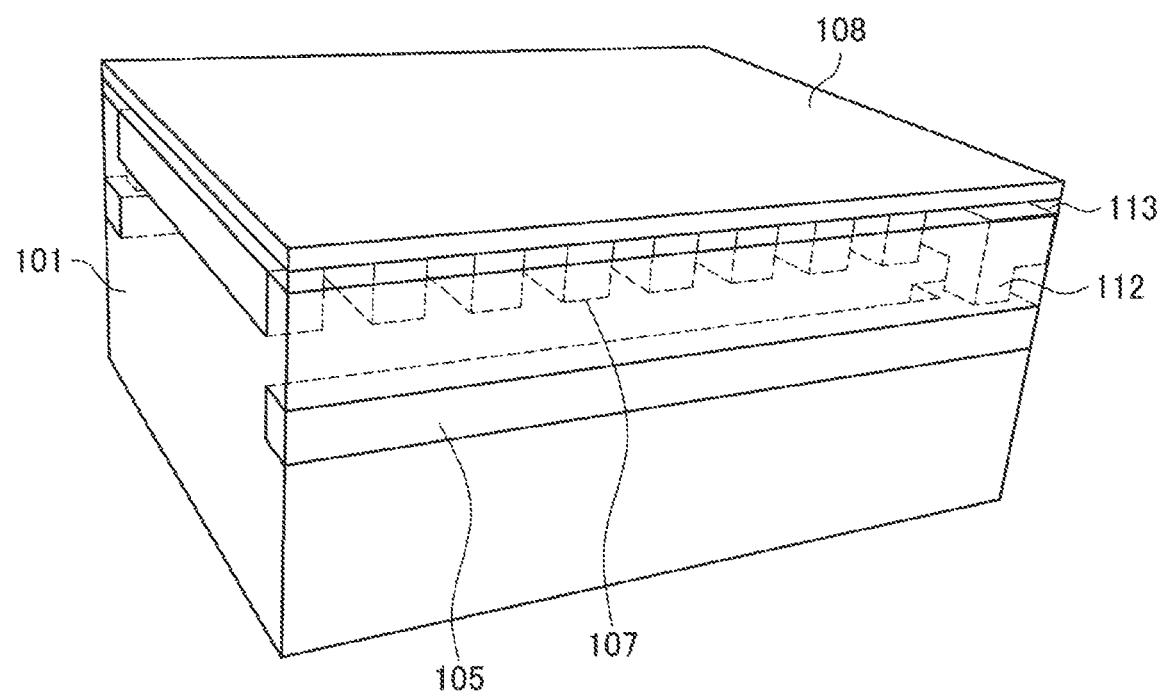
FIG. 3 is a stereoscopic view of the liquid crystal display device according to the same embodiment.

FIG. 3 is a perspective view three-dimensionally illustrating how the pixel electrode 108 and the wire grid polarizer 107 are connected to the common potential wiring 105. As illustrated in FIG. 3, the common potential wiring 105 that applies a common potential (common potential) over the plurality of pixels is arranged so as to extend in a plane parallel to the pixel electrode 108 in a direction orthogonal to an extending direction of the metal wires. Further, the common potential wiring 105 is electrically connected to the wire grid polarizer 107 by the common potential connection contact plug 112 at a corner of the wire grid polarizer 107. The metal wires of the wire grid polarizer 107 are electrically connected to each other at their ends, and are further electrically connected to the common potential wiring 105 by the common potential connection contact plug 112. As a result, the common potential is supplied to each metal wire of the wire grid polarizer 107. The wire grid polarizer 107 is arranged so as to face the pixel electrode 108 via the first insulating layer 113, and is capable of retaining electric charges by applying of different potentials to the pixel electrode 108 and the wire grid polarizer 107.

Figure 4:
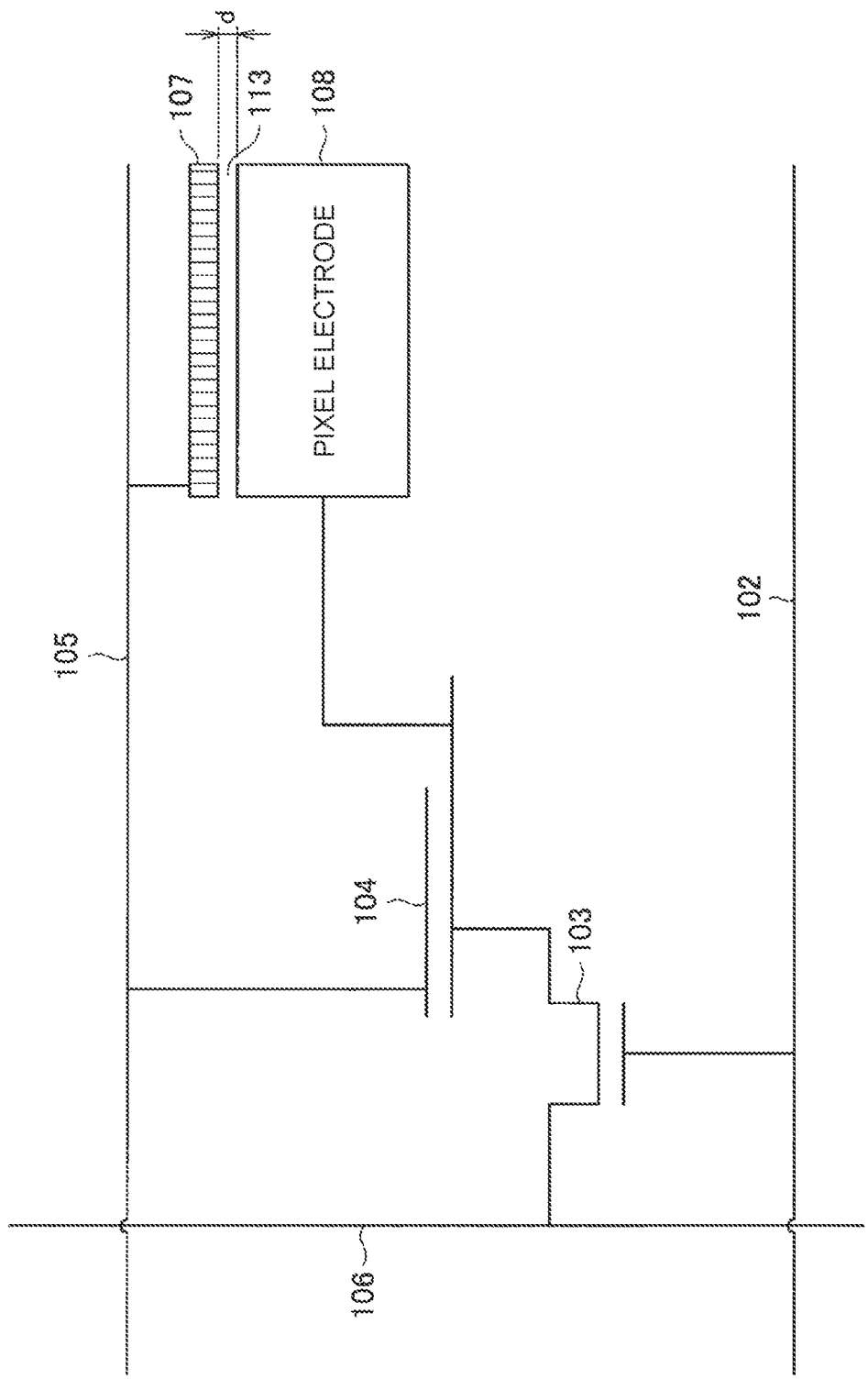
FIG. 4 is a circuit diagram of the liquid crystal display device according to the same embodiment.

FIG. 4 is a circuit diagram illustrating an equivalent circuit of one pixel of the liquid crystal display device 100 described in FIGS. 1 to 3. With reference to FIG. 4, the signal line electrode 106 including a power supply line that supplies a voltage to the pixel electrode 108 is connected to the source of the drive transistor 103. The scanning line 102 is connected to a gate of the drive transistor 103 and controls on/off of conduction between the source and the drain of the drive transistor 103. The pixel electrode 108 is electrically connected to the drain of the drive transistor 103. When conduction between the source and the drain of the drive transistor 103 is turned on by voltage application from the scanning line 102, the voltage supplied from the signal line electrode 106 is applied to the pixel electrode 108. The second capacitor is formed by the pair of conductive materials 104 between wiring that electrically connects the drain of the drive transistor 103 to the pixel electrode 108 and the common potential wiring 105. In addition, since the wire grid polarizer 107 is arranged to face the pixel electrode 108 and is electrically connected to the common potential wiring 105, the first capacitor is formed between the wire grid polarizer 107 and the pixel electrode 108.

With the above circuit structure, the storage capacitance of each pixel of the liquid crystal display device 100 can be configured by the storage capacitance of the first capacitor and the second capacitor. According to this configuration, the liquid crystal display device 100 can reduce the capacitance of the second capacitor formed in the light-shielding region Y, as compared with a case where the first capacitor is not formed. Therefore, in the liquid crystal display device 100, the plane area of the second capacitor is reduced and the light-shielding region Y of the pixel is reduced, so that the plane area of the aperture region of the pixel can be increased and the aperture ratio can be improved.

Further, in the liquid crystal display device 100, since the storage capacitance of each pixel can be configured by the storage capacitance of the first capacitor and the second capacitor, the storage capacitance of each pixel can be increased. Therefore, in the liquid crystal display device 100, by increasing the storage capacitance of each pixel, it is possible to suppress influence of light leakage and suppress an occurrence of image defects (flicker or the like). According to this configuration, the liquid crystal display device 100 can also improve the image quality.

2. Modification of the Present Disclosure

Figure 5:
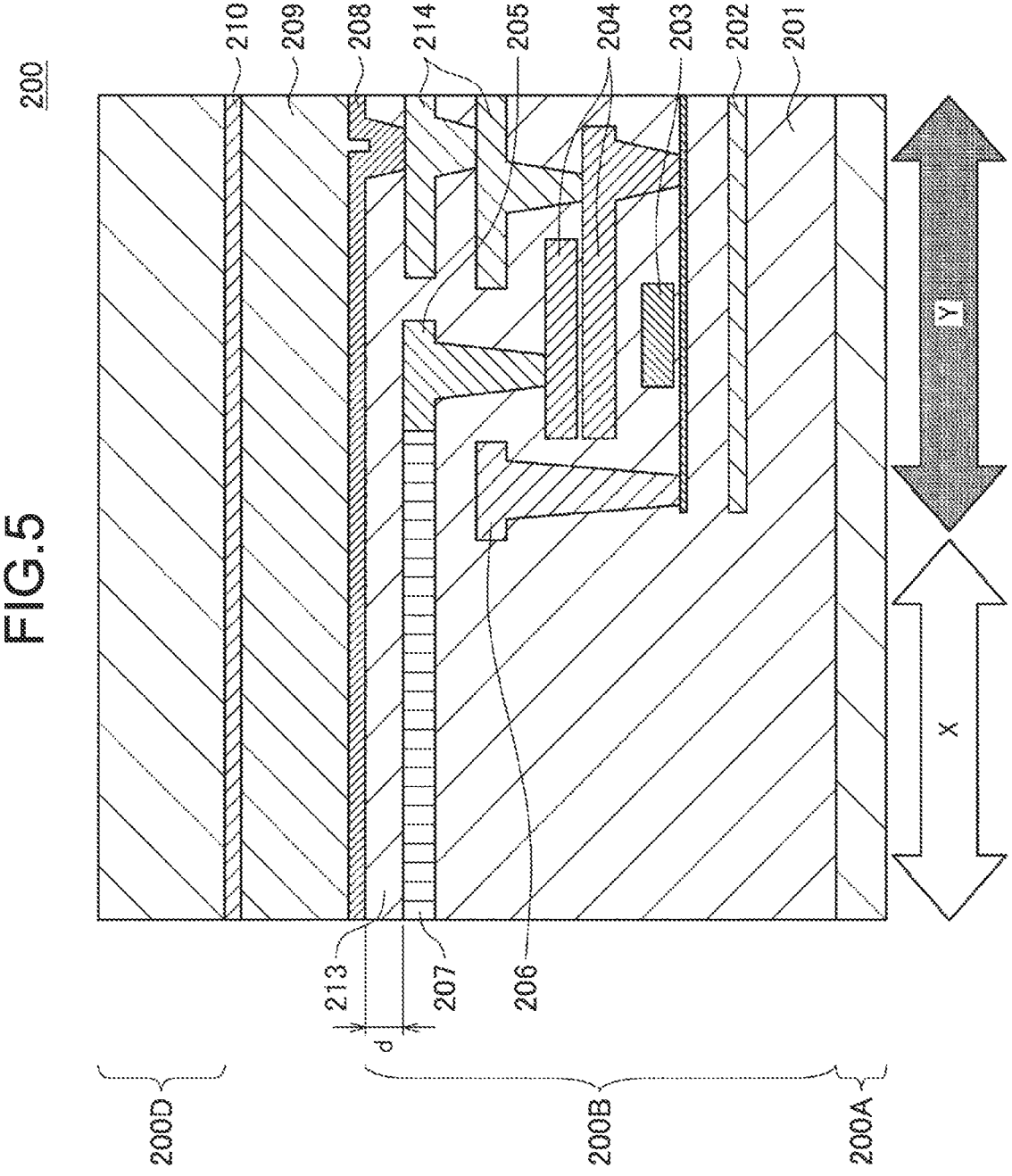
FIG. 5 is a diagram illustrating a modification of the liquid crystal display device according to the same embodiment.

One embodiment of the technique of the present disclosure has been described above. A modification of the present embodiment will be described with reference to FIG. 5. FIG. 5 is a diagram illustrating an example of a modification of the present embodiment.

As illustrated in FIG. 5, a liquid crystal display device 200 is provided with a pixel electrode 208 and a counter electrode 210 with a liquid crystal layer 209 interposed therebetween. A drive circuit layer 200B is provided on a surface side of the pixel electrode 208 opposite to a surface side on which the liquid crystal layer 209 is provided, and a drive-side substrate 200A is provided on a surface of the drive circuit layer 200B opposite to a surface on which the pixel electrode 208 is provided. Further, a counter-side substrate 200D is provided on a surface of the counter electrode 210 opposite to a surface on which the liquid crystal layer 209 is provided. Then, in the drive circuit layer 200B, a wire grid polarizer 207 formed by arranging of metal wires extending in one direction at equal intervals and given a predetermined potential is provided to face the pixel electrode 208.

The drive circuit layer 200B is provided with a scanning line 202, a drive transistor 203, the wire grid polarizer 207, common potential wiring 205, circuit wiring 214 for bringing the drive transistor 203 and the pixel electrode 208 into conduction with each other, and a signal line electrode 206.

As a positional relationship among these elements, the scanning line 202 is provided closest to a side of the drive-side substrate 200A in the drive circuit layer 200B. The drive transistor 203 is provided above the scanning line 202 via an interlayer insulating film. The signal line electrode 206 for supplying electric power from a power source is connected to a source of the drive transistor 203, and a pair of conductive materials 204 is arranged in the vertical direction above the drive transistor 203 via the interlayer insulating film. The lower conductive material 204 is electrically connected to a drain of the drive transistor 203, and the upper conductive material 204 is electrically connected to the common potential wiring 205 provided above the pair of conductive materials 204. The drain of the drive transistor 203 is further electrically connected to the pixel electrode 208 by the circuit wiring 214. The common potential wiring 205 is provided in the same layer as the wire grid polarizer 207, and is electrically connected to the wire grid polarizer 207 by extending in an in-plane direction of a layer in which the common potential wiring 205 is provided.

In this modification, the common potential wiring 205 is provided in the same layer as the wire grid polarizer 207. Since the common potential wiring 205 is provided in the same layer as the wire grid polarizer 207, the liquid crystal display device 200 can reduce the number of wiring layers, and thus the structure can be further simplified. Note that the functions and materials of the above-described configurations are as described with reference to FIGS. 1 to 4, and thus description thereof will be omitted here.

Further, as another modification, the wire grid polarizer 207 can be provided over a plurality of pixels instead of being provided for each pixel. Since the wire grid polarizer 207 is given a common potential common to other pixels, the wire grid polarizer 207 may not be separated for each pixel. In this case, as long as the wire grid polarizer 207 provided over the plurality of pixels is electrically connected to the common potential wiring 205 at least one place, the wire grid polarizer 207 can have a common potential. Therefore, the wire grid polarizer 207 can form a first capacitor with the pixel electrode 208 in each pixel. By providing the wire grid polarizer 207 over a plurality of pixels, it is possible to further simplify a manufacturing process of the liquid crystal display device 200.

Thus far, an example of the present embodiment and a modification of the same embodiment have been described. The liquid crystal display device illustrated in the example of this embodiment and the modification of the same embodiment can be manufactured by a known method for manufacturing a semiconductor laminated structure.

3. Application Example

Figure 6:
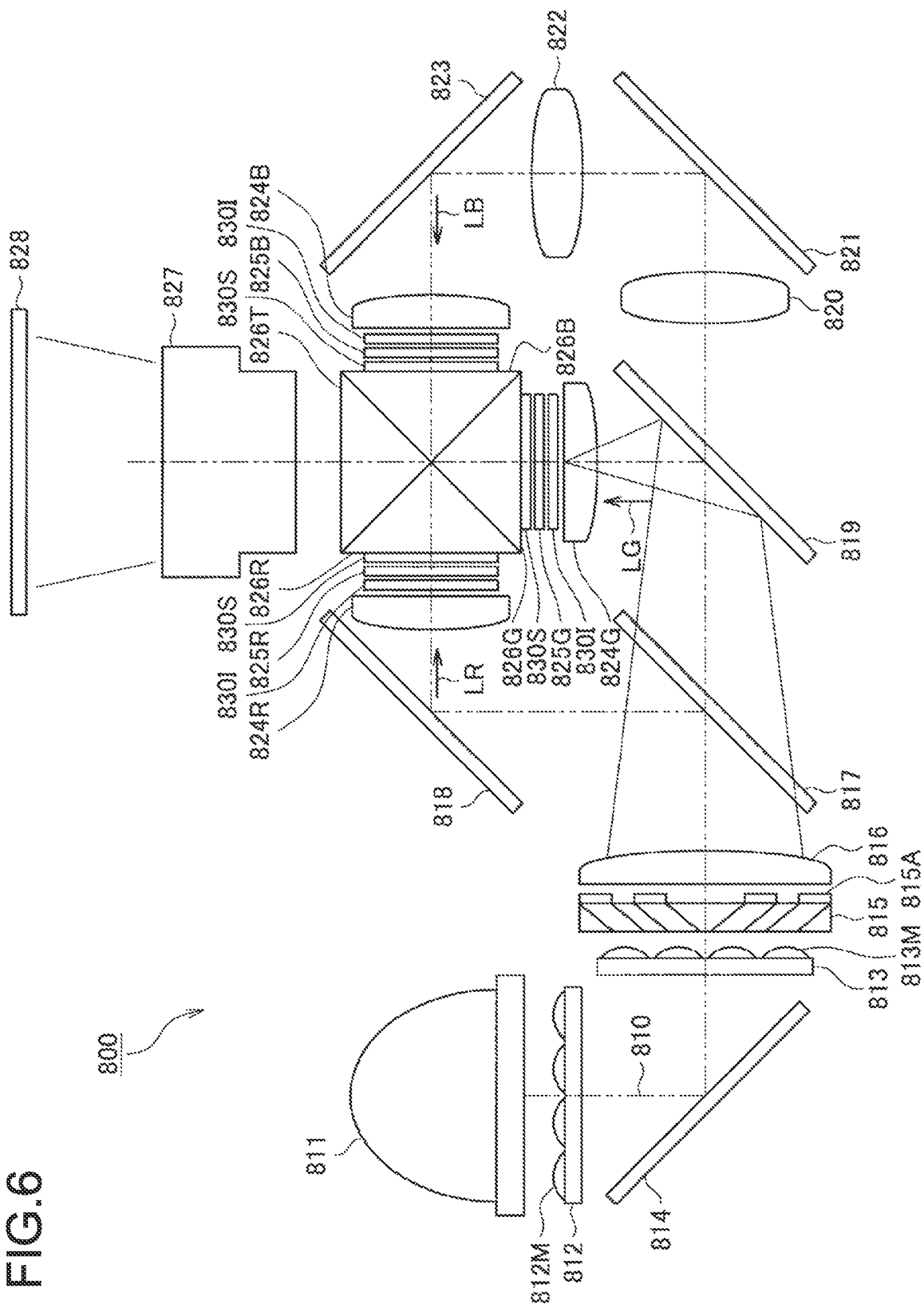
FIG. 6 is a diagram illustrating an application example of the liquid crystal display device according to the same embodiment.

The liquid crystal display device of the present embodiment is used, for example, in a projection type display device (so-called liquid crystal projector) as illustrated in FIG. 6. A liquid crystal projector 800 illustrated in FIG. 6 is a so-called three-panel projector that separates light from a light source into three primary colors of red, blue, and green, and performs color image display by using one liquid crystal display device 100 for each color. Light valves respectively corresponding to the three primary colors correspond to the liquid crystal display device 100 illustrated in FIG. 1. Hereinafter, red light is incident on a liquid crystal display device 825R, green light is incident on liquid crystal display device 825G, and blue light is incident on a liquid crystal display device 825B.

The liquid crystal projector 800 of FIG. 6 includes a light source 811 that emits light, a first lens array 812 arranged on an emission side of the light from the light source 811, a mirror 814 that reflects emitted light from the first lens array 812 and changes an optical path (optical axis 810) of the emitted light by 90°, and a second lens array 813 on which the reflected light from the mirror 814 enters.

Here, the mirror 814 is preferably a total reflection mirror. A plurality of microlenses 812M and 813M is two-dimensionally arranged in the first lens array 812 and the second lens array 813, respectively.

The first lens array 812 and the second lens array 813 make illuminance distribution of light uniform, and have a function of dividing incident light into a plurality of small luminous fluxes. An ultra violet (UV)/infrared (IR) cut filter, which is not illustrated, may be installed between the light source 811 and the first lens array 812.

The light source 811 emits white light including red light, blue light, and green light necessary for displaying a color image. The light source 811 includes a light emitting body (not illustrated) that emits the white light and a reflector that reflects and condenses the light emitted from the light emitting body.

As the light emitting body, for example, a lamp such as an ultra-high pressure mercury lamp, a halogen lamp, a metal halide lamp or a xenon lamp is used. Further, the light emitting body is not limited to the lamp, and a light emitting diode (LED), a laser, a laser-excited phosphor, or the like may be used, or a combination thereof may be used as the light emitting body. It is desirable that the reflector has a shape with good light-condensing efficiency, and may have, for example, a rotationally symmetrical recessed surface shape such as a spheroidal mirror or a rotary paraboloid. Further, a light emitting point of the light emitting body is arranged at a focal position of the reflector having a recessed surface shape.

The white light emitted from the light emitting body of the light source 811 becomes substantially parallel light by the reflector, passes through the first lens array 812, and enters the mirror 814. The white light whose optical axis 810 is bent by 90° by the mirror 814 is incident on the second lens array 813.

The liquid crystal projector 800 illustrated in FIG. 6 has a PS synthesizing element 815, a condenser lens 816, and a dichroic mirror 817 on a side on which the light is emitted from the second lens array 813.

The PS synthesizing element 815 is provided with a plurality of retardation plates 815A at positions corresponding to spaces between the adjacent microlenses in the second lens array 813. Each retardation plate 815A may be, for example, a half-wave plate.

The PS synthesizing element 815 separates the incident light into polarized light of a P-polarized component and an S-polarized component. Further, the PS synthesizing element 815 emits one of the two separated and polarized components from the PS synthesizing element 815 while maintaining a polarization direction of the one polarized component (for example, P-polarized light), and emits the other polarized component (for example, S-polarized component) after converting the other polarized component into another polarized component (for example, P-polarized component) by an action of the retardation plate 815A using a half-wave plate.

The light emitted from the PS synthesizing element 815 is condensed by the condenser lens 816 and enters the dichroic mirror 817. The dichroic mirror 817 reflects, for example, red light LR of the incident light and transmits light of other colors, thereby separating the incident light into red light LR and other colors.

Further, the liquid crystal projector 800 includes a mirror 818, a field lens 824R, an incident-side polarization plate 830I, the liquid crystal display device 825R, and an emission-side polarization plate 830S along an optical path of the red light LR color-separated by the dichroic mirror 817.

Here, as the mirror 818, a total reflection mirror is preferably used. The mirror 818 reflects the red light LR color-separated by the dichroic mirror 817 toward the incident-side polarization plate 830I and the liquid crystal display device 825R.

As described above, the incident-side polarization plate 830I transmits, of the red light LR incident from the mirror 818, light in a direction coinciding with a polarization axis.

The liquid crystal display device 825R has the same structure as the above-described liquid crystal display device, and the red light LR incident via the incident-side polarization plate 830I provided as necessary is spatially modulated according to input image data.

Further, the emission-side polarization plate 830S provided as necessary transmits, of the modulated red light LR from the liquid crystal display device 825R, light in the direction coinciding with the polarization axis.

The liquid crystal projector 800 has a dichroic mirror 819 along an optical path of light of the other colors separated by the dichroic mirror 817. Of the incident light, the dichroic mirror 819 reflects, for example, the green light LG and transmits the blue light LB to separate the incident light into the green light LG and the blue light LB.

A field lens 824G, the incident-side polarization plate 830I, the liquid crystal display device 825G, and the emission-side polarization plate 830S are provided in the optical path of the green light LG color-separated by the dichroic mirror 819. The incident-side polarization plate 830I and the emission-side polarization plate 830S are provided as necessary.

The incident-side polarization plate 830I transmits, of the green light LG incident from the dichroic mirror 819, light in the direction that coinciding with the polarization axis. The liquid crystal display device 825G spatially modulates the green light LG incident through the incident-side polarization plate 830I according to the input image data. The emission-side polarization plate 830S transmits, of the modulated green light LG from the liquid crystal display device 825G, light in the direction coinciding with the polarization axis.

Further, along an optical path of the blue light LB color-separated by the dichroic mirror 819, a relay lens 820, a mirror 821, a relay lens 822, a mirror 823, a field lens 824B, the incident-side polarization plate 830I, the liquid crystal display device 825B, and the emission-side polarization plate 830S are provided. The incident-side polarization plate 830I and the emission-side polarization plate 830S are provided as necessary.

The mirrors 821 and 823 are preferably total reflection mirrors. The mirror 821 reflects the blue light LB incident through the relay lens 820 toward the mirror 823. The mirror 823 reflects the blue light LB reflected by the mirror 821 and incident through the relay lens 822 toward the incident-side polarization plate 830I and the liquid crystal display device 825B.

The incident-side polarization plate 830I transmits, of the blue light LB incident from the mirror 823, light in the direction coinciding with the polarization axis. The liquid crystal display device 825B spatially modulates the blue light LB reflected by the mirror 823 and incident through the field lens 824B and the incident-side polarization plate 830I according to the input image data.

The emission-side polarization plate 830S transmits, of the modulated blue light LB from the liquid crystal display device 825B, light in the direction coinciding with the polarization axis. At a position where the optical paths of the red light LR, the green light LG, and the blue light LB intersect, a cross prism 826 having a function of combining light of these three colors is installed.

The cross prism 826 is configured, for example, by joining four rectangular prisms respectively having incident surfaces 826R, 826G, and 826B on which the red light LR, the green light LG, and the blue light LB are respectively incident, and an emission surface 826T for emitting light obtained by combining the red light LR, the green light LG, and the blue light LB.

In the liquid crystal projector 800, a dichroic film is coated on a bonding surface of each rectangular prism so that the green light LG entering the cross prism 826 is transmitted toward a side of the emission surface 826T, and the red light LR and the blue light LB entering the cross prism 826 are reflected toward the side of the emission surface 826T. As described above, the cross prism 826 combines the light of three colors entering the incident surfaces 826R, 826G, and 826B and emits the combined light from the emission surface 826T.

Further, the liquid crystal projector 800 has a projection lens 827 for projecting the combined light emitted from the cross prism 826 toward a screen 828. The projection lens 827 preferably includes a plurality of lenses and has a zoom function for adjusting a size of an image projected on the screen 828 and a focusing function.

In the above-described liquid crystal projector 800, by applying the liquid crystal display device of the present embodiment to the liquid crystal display devices 825R, 825G, and 825B, it is possible to improve the aperture ratio of the liquid crystal display device, and increase brightness of projection light.

The structure and application example of the liquid crystal display device 100 according to the technique of the present disclosure have been described above.

4. Example

Figure 8:
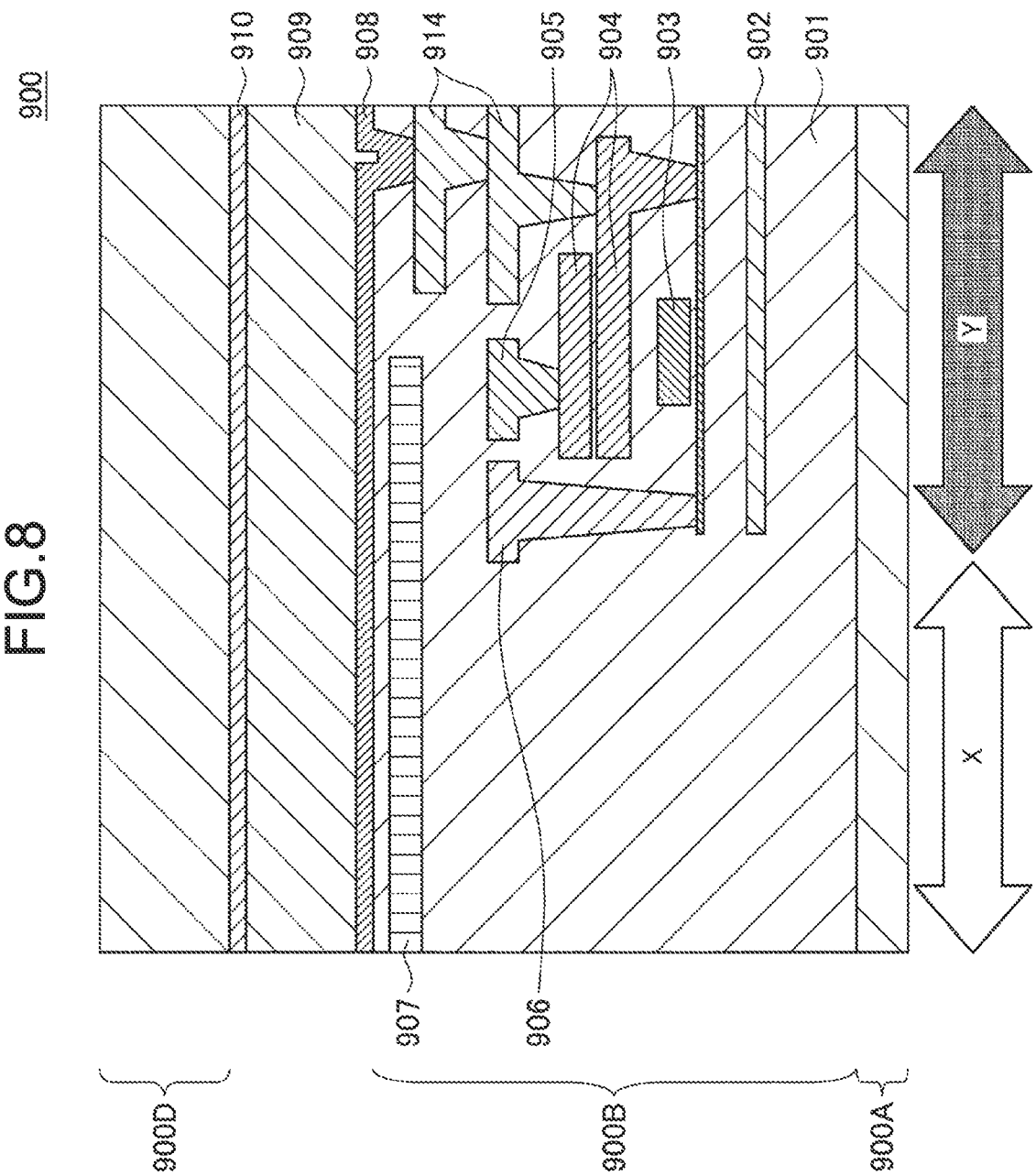
FIG. 8 is a diagram illustrating the comparative example of the liquid crystal display device according to the same embodiment.

As described below, an effect of the liquid crystal display device 100 according to the present embodiment has been confirmed. The liquid crystal display device 100 illustrated in FIG. 1 is used as a first example, a liquid crystal display device 900 illustrated in FIG. 8 is used as a first comparative example to confirm the effect. The effect has been confirmed in two ways. In a first effect, the effect of improving the aperture ratio has been confirmed on the premise of maintaining light resistance, and in a second effect, the effect of improving the light resistance has been confirmed on the premise of maintaining the aperture ratio.

The liquid crystal display device 900 illustrated in the first comparative example has the same configuration as the liquid crystal display device 100 in the first example except that a wire grid polarizer 907 is not connected to a common potential wiring 905. That is, the liquid crystal display device 900 illustrated in the first comparative example is different from the liquid crystal display device 100 in the first example in that the wire grid polarizer 907 is in a floating state, and thus the first capacitor is not formed between the wire grid polarizer 907 and a pixel electrode 908.

The liquid crystal display device 100 according to the first example and the liquid crystal display device 900 according to the first comparative example are assumed to be so-called 0.64 wide ultra extended graphics array (WUXGA) panels, and the storage capacitance is calculated.

Specifically, a pitch of each pixel is 7.2 μm. The first insulating layer is a silicon oxide film having a relative dielectric constant k=4.2, and the distance d between the pixel electrode and the wire grid is 50 nm. Further, a vacuum dielectric constant ε is $8.854 \times 10^{-12}$, and the plane area where the pixel electrode and the wire grid polarizer face each other is 19.49 μm².

When calculations are performed using these conditions, it is found that in the first example, the first capacitor increases the storage capacitance by 14.5 fF as compared with the first comparative example.

Therefore, in the liquid crystal display device 100 according to the first example, assuming that the storage capacitance that affects the light resistance is maintained, the storage capacitance of the second capacitor formed in the light-shielding region Y can be reduced by the storage capacitance of the first capacitor. According to this configuration, in the liquid crystal display device 100 according to the first example, the plane area of the light-shielding region Y can be reduced by reducing of the plane area of the second capacitor, thus the aperture ratio of each pixel can be improved (first effect). For example, in the liquid crystal display device 100 according to the first example, when the capacitance of 14.5 fF is used for improving the aperture ratio as the first effect, an aperture area is increased by 4.2 μm² with respect to a total pixel area of the pixel of 51.84 μm². Therefore, the liquid crystal display device 100 according to the first example can increase the aperture ratio by 8.18% as compared with the liquid crystal display device 900 according to the first comparative example.

Further, in the liquid crystal display device 100 according to the first example, assuming that the aperture ratio is maintained, the storage capacitance of the pixel can be increased by the storage capacitance of the first capacitor. According to this configuration, in the liquid crystal display device 100 according to the first example, it is possible to suppress flicker that causes deterioration of image quality and improve the light resistance by increasing the storage capacitance of the pixel (second effect). For example, a case of using capacitance of 14.5 fF for improving the light resistance will be described with reference to FIG. 7.

Figure 7:
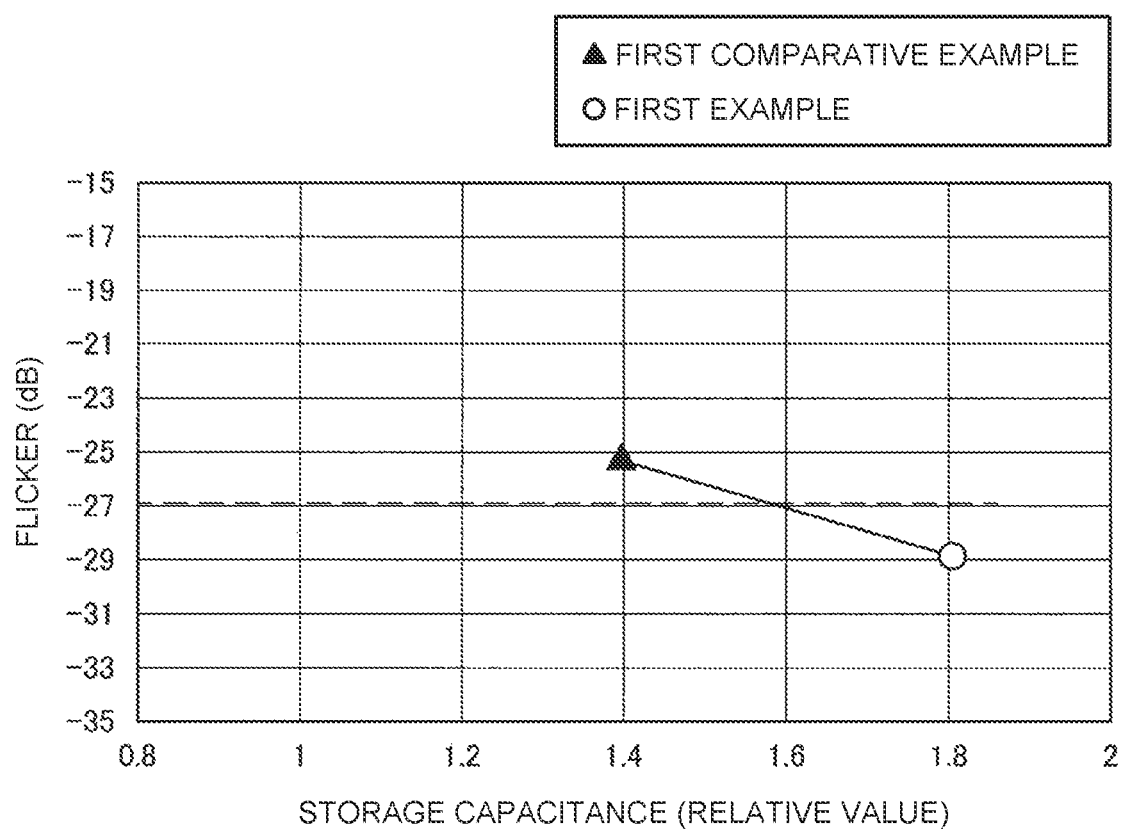
FIG. 7 is a graph illustrating effects of an example and a comparative example of the liquid crystal display device according to the same embodiment.

FIG. 7 illustrates a general graph illustrating a correlation between the storage capacitance of a pixel and flicker (dB) which is an index of light resistance. Flicker indicates frequency of flicker reduction. In FIG. 7, the flicker of the liquid crystal display device 900 according to the first comparative example is illustrated by a triangular plot, and the flicker of the liquid crystal display device 100 according to the first example is illustrated by a white circle plot. With reference to FIG. 7, it can be seen that in the liquid crystal display device 100 according to the first example, the flicker is reduced to −27 dB or less due to the increased storage capacitance. It has been found out that since a person cannot recognize the reduction in flicker on a screen at a value of −27 dB, the liquid crystal display device 100 according to the first example to which the technique of the present disclosure is applied reduces the flicker of an image to a level at which a person cannot visually recognize the flicker.

As described above, the preferred embodiment of the present disclosure have been described in detail with reference to the accompanying drawings, but the technical scope of the present disclosure is not limited to such examples. It is obvious that persons having ordinary knowledge in the technical field of the present disclosure can conceive various changes and alterations within the scope of the technical idea described in the claims, and it is naturally understood that these changes and alterations belong to the technical scope of the present disclosure.

Furthermore, the effects described in the present specification are merely illustrative or exemplary and are not restrictive. That is, the technique according to the present disclosure can exhibit other effects obvious to those skilled in the art from the description of the present specification in addition to or in place of the above-described effects.

Note that the following configurations also belong to the technical scope of the present disclosure.

(1)

A liquid crystal display device comprising
a plurality of pixels each including:
a pixel electrode and a counter electrode provided with a liquid crystal layer interposed between the pixel electrode and the counter electrode;
a drive circuit layer provided on a surface side of the pixel electrode opposite to a surface side on which the liquid crystal layer is provided, in which a drive circuit is formed including a drive transistor that controls application of a potential to the pixel electrode;
a drive-side substrate provided on a surface of the drive circuit layer opposite to a surface on which the pixel electrode is provided; and
a counter-side substrate provided on a surface of the counter electrode opposite to a surface on which the liquid crystal layer is provided, wherein
the drive circuit layer is provided with a wire grid polarizer facing the pixel electrode, the wire grid polarizer being formed through arranging of metal wires extending in one direction at equal intervals, and given a predetermined potential.

(2)

The liquid crystal display device according to (1), wherein the pixel electrode and the wire grid polarizer face each other with a first insulating layer interposed between the pixel electrode and the wire grid polarizer.

(3)

The liquid crystal display device according to (1) or (2), wherein
the drive circuit layer is provided with common potential wiring that supplies a common potential to the plurality of pixels, and
the wire grid polarizer is electrically connected to the common potential wiring to be given a predetermined potential.

(4)

The liquid crystal display device according to (2), wherein the pixel electrode and the wire grid polarizer form a first capacitor via the first insulating layer.

(5)

The liquid crystal display device according to any one of (1) to (4), wherein the metal wires of the wire grid polarizer are electrically connected to each other at end portions.

(6)

The liquid crystal display device according to (3), wherein the common potential wiring is provided on a side of the drive transistor with respect to the wire grid polarizer, and the common potential wiring and the wire grid polarizer are electrically connected by a contact plug.

(7)

The liquid crystal display device according to (3), wherein the common potential wiring is provided in a same layer as the wire grid polarizer.

(8)

The liquid crystal display device according to (3), wherein a plane region of the plurality of pixels is divided into an aperture region through which incident light to the pixels is transmitted, and a light-shielding region where the incident light to the pixels is shielded, and the common potential wiring and the wire grid polarizer are connected in the light-shielding region.

(9)

The liquid crystal display device according to (8), wherein the pixel electrode is electrically connected to a drain of the drive transistor, and a second capacitor is formed between wiring that electrically connects the drain of the drive transistor and the pixel electrode and the common potential wiring.

(10)

The liquid crystal display device according to (9), wherein the second capacitor is provided in the light-shielding region.

(11)

The liquid crystal display device according to (2), wherein the first insulating layer contains silicon oxide, silicon nitride, silicon oxynitride, hafnium oxide, or aluminum oxide.

(12)

The liquid crystal display device according to (2) or (11), wherein the first insulating layer is formed of a transparent material.

(13)

The liquid crystal display device according to any one of (1) to (12), wherein the pixel electrode and the counter electrode are formed of a transparent conductive material.

(14)

The liquid crystal display device according to any one of (1) to (13), wherein the wire grid polarizer is formed over the plurality of adjacent pixels.

(15)

A projection type display device comprising: a light source, a condensing optical system that guides light emitted from the light source to a liquid crystal display device, and a projection optical system that enlarges and projects light optically modulated by the liquid crystal display device, wherein the liquid crystal display device includes a plurality of pixels each including: a pixel electrode and a counter electrode provided with a liquid crystal layer interposed between the pixel electrode and the counter electrode; a drive circuit layer provided on a surface side of the pixel electrode opposite to a surface side on which the liquid crystal layer is provided, in which a drive circuit is formed including a drive transistor that controls application of a potential to the pixel electrode; a drive-side substrate provided on a surface of the drive circuit layer opposite to a surface on which the pixel electrode is provided; and a counter-side substrate provided on a surface of the counter electrode opposite to a surface on which the liquid crystal layer is provided, and the drive circuit layer is provided with a wire grid polarizer facing the pixel electrode, the wire grid polarizer being formed through arranging of metal wires extending in one direction at equal intervals, and given a predetermined potential.

REFERENCE SIGNS LIST

100 LIQUID CRYSTAL DISPLAY DEVICE
100A DRIVE-SIDE SUBSTRATE
100B DRIVE CIRCUIT LAYER
100D COUNTER-SIDE SUBSTRATE
102 SCANNING LINE
103 DRIVE TRANSISTOR
104 CONDUCTIVE MATERIAL
105 COMMON POTENTIAL WIRING
106 SIGNAL LINE ELECTRODE
107 WIRE GRID POLARIZER
108 PIXEL ELECTRODE
109 LIQUID CRYSTAL LAYER
110 COUNTER ELECTRODE
112 COMMON POTENTIAL CONNECTION CONTACT PLUG
113 FIRST INSULATING LAYER
114 CIRCUIT WIRING

The invention claimed is:

1. A liquid crystal display device, comprising:
a plurality of pixels, wherein each pixel of the plurality of pixels includes:
a pixel electrode;
a counter electrode;
a liquid crystal layer between the pixel electrode and the counter electrode, wherein the liquid crystal layer is on a first surface side of the pixel electrode and on a first surface of the counter electrode;
a drive circuit layer on a second surface side of the pixel electrode, wherein
the second surface side of the pixel electrode is opposite to the first surface side of the pixel electrode,
the pixel electrode is on a first surface of the drive circuit layer, and
the drive circuit layer includes:
a drive circuit that includes a drive transistor, wherein the drive transistor is configured to control application of a potential to the pixel electrode,
a wire grid polarizer opposite to the pixel electrode, wherein the wire grid polarizer includes a plurality of metal wires that extend in one direction;
a common potential wiring between the wire grid polarizer and the drive transistor, wherein the common potential wiring is configured to supply a common potential to the plurality of pixels;

a specific wiring configured to electrically connect a drain of the drive transistor and the pixel electrode;
a second capacitor between the specific wiring and the common potential wiring, wherein
the second capacitor includes a plurality of conductive materials,
a first conductive material of the plurality of conductive materials is connected to the common potential wiring,
a second conductive material of the plurality of conductive materials is connected to the drive transistor, and
the plurality of conductive materials is different from the wire grid polarizer; and
a contact plug that includes a first surface and a second surface opposite to the first surface of the contact plug, wherein
the first surface of the contact plug is in contact with the wire grid polarizer,
the second surface of the contact plug is in contact with the common potential wiring, and
the wire grid polarizer is connectable to the common potential wiring via the contact plug;
a drive-side substrate on a second surface of the drive circuit layer, wherein the second surface of the drive circuit layer is opposite to the first surface of the drive circuit layer; and
a counter-side substrate on a second surface of the counter electrode, wherein the second surface of the counter electrode is opposite to the first surface of the counter electrode.

2. The liquid crystal display device according to claim 1, further comprising a first insulating layer between the pixel electrode and the wire grid polarizer.

3. The liquid crystal display device according to claim 2, further comprising a first capacitor that includes the pixel electrode, the wire grid polarizer, and the first insulating layer between the pixel electrode and the wire grid polarizer.

4. The liquid crystal display device according to claim 1, wherein the plurality of metal wires of the wire grid polarizer includes a first metal wire electrically connectable to an end portion of a second metal wire of the plurality of metal wires.

5. The liquid crystal display device according to claim 1, further comprising a specific layer that includes the common potential wiring and the wire grid polarizer.

6. The liquid crystal display device according to claim 1, wherein
the plurality of pixels includes a plane region divided into:
an aperture region configured to transmit light incident on the plurality of pixels, and
a light-shielding region configured to shield the incident light, and
the common potential wiring is connected to the wire grid polarizer in the light-shielding region.

7. The liquid crystal display device according to claim 6, wherein the light-shielding region includes the second capacitor.

8. The liquid crystal display device according to claim 2, wherein the first insulating layer includes at least one of silicon oxide, silicon nitride, silicon oxynitride, hafnium oxide, or aluminum oxide.

9. The liquid crystal display device according to claim 2, wherein the first insulating layer includes a transparent material.

10. The liquid crystal display device according to claim 1, wherein each of the pixel electrode and the counter electrode includes a transparent conductive material.

11. The liquid crystal display device according to claim 1, wherein the wire grid polarizer is over adjacent pixels of the plurality of pixels.

12. A projection type display device, comprising:
a light source configured to emit light;
a liquid crystal display device;
a condensing optical system configured to guide the light emitted from the light source to the liquid crystal display device, wherein the liquid crystal display device is configured to optically modulate the guided light; and
a projection optical system configured to enlarge and project the optically modulated light, wherein
the liquid crystal display device includes a plurality of pixels, and
each pixel of the plurality of pixels includes:
a pixel electrode;
a counter electrode;
a liquid crystal layer between the pixel electrode and the counter electrode, wherein the liquid crystal layer is on a first surface side of the pixel electrode and on a first surface of the counter electrode;
a drive circuit layer on a second surface side of the pixel electrode, wherein
the second surface side of the pixel electrode is opposite to the first surface side of the pixel electrode,
the pixel electrode is on a first surface of the drive circuit layer, and
the drive circuit layer includes:
a drive circuit that includes a drive transistor, wherein the drive transistor is configured to control application of a potential to the pixel electrode,
a wire grid polarizer opposite to the pixel electrode, wherein the wire grid polarizer includes a plurality of wires that extend in one direction;
a common potential wiring between the wire grid polarizer and the drive transistor, wherein the common potential wiring is configured to supply a common potential to the plurality of pixels;
a specific wiring configured to electrically connect a drain of the drive transistor and the pixel electrode;
a second capacitor between the specific wiring and the common potential wiring, wherein
the second capacitor includes a plurality of conductive materials,
a first conductive material of the plurality of conductive materials is connected to the common potential wiring,
a second conductive material of the plurality of conductive materials is connected to the drive transistor, and
the plurality of conductive materials is different from the wire grid polarizer; and
a contact plug that includes a first surface and a second surface opposite to the first surface of the contact plug, wherein
the first surface of the contact plug is in contact with the wire grid polarizer,
the second surface of the contact plug is in contact with the common potential wiring, and the wire grid polarizer is connectable to the common potential wiring via the contact plug;
a drive-side substrate on a second surface of the drive circuit layer, wherein the second surface of the drive circuit layer is opposite to the first surface of the drive circuit layer; and
a counter-side substrate on a second surface of the counter electrode, wherein the second surface of the counter electrode is opposite to the first surface of the counter electrode.

* * * * *